(12) United States Patent
Gudde et al.

(10) Patent No.: US 8,742,184 B2
(45) Date of Patent: Jun. 3, 2014

(54) PROCESS FOR HYDROGENATION OF CARBOXYLIC ACIDS AND DERIVATIVES TO HYDROCARBONS

(75) Inventors: Nicholas John Gudde, Windlesham (GB); James Adam Townsend, Ashgrove (AU)

(73) Assignee: BP Oil International Limited, Middlesex (GB)

( * ) Notice: Subject to any disclaimer, the term of this patent is extended or adjusted under 35 U.S.C. 154(b) by 663 days.

(21) Appl. No.: 12/311,494

(22) PCT Filed: Oct. 4, 2007

(86) PCT No.: PCT/GB2007/003757
§ 371 (c)(1),
(2), (4) Date: Apr. 1, 2009

(87) PCT Pub. No.: WO2008/040973
PCT Pub. Date: Apr. 10, 2008

(65) Prior Publication Data
US 2010/0036183 A1   Feb. 11, 2010

(30) Foreign Application Priority Data
Oct. 6, 2006   (EP) .................................. 06255162

(51) Int. Cl.
*C07C 1/22* (2006.01)
(52) U.S. Cl.
USPC ............................ 585/240; 585/242; 585/733
(58) Field of Classification Search
USPC .................. 585/240, 250, 700, 733, 752, 242
See application file for complete search history.

(56) References Cited

U.S. PATENT DOCUMENTS

| | | | | | |
|---|---|---|---|---|---|
| 3,477,963 | A | * | 11/1969 | van Venrooy | 502/220 |
| 4,405,581 | A | * | 9/1983 | Savage et al. | 423/226 |
| 4,992,605 | A | * | 2/1991 | Craig et al. | 585/240 |
| 4,997,630 | A | * | 3/1991 | Wagner et al. | 423/228 |
| 5,705,722 | A | * | 1/1998 | Monnier et al. | 585/240 |
| 2004/0230085 | A1 | * | 11/2004 | Jakkula et al. | 585/240 |
| 2006/0186020 | A1 | * | 8/2006 | Gomes | 208/46 |
| 2006/0207166 | A1 | * | 9/2006 | Herskowitz et al. | 44/385 |
| 2007/0175795 | A1 | * | 8/2007 | Yao et al. | 208/142 |
| 2009/0082603 | A1 | * | 3/2009 | Kalnes et al. | 585/240 |

FOREIGN PATENT DOCUMENTS

| WO | WO 2006/075057 | 7/2006 |
|---|---|---|
| WO | WO 2006/111997 | 10/2006 |

OTHER PUBLICATIONS

Hiller, et al., "Gas Production" in Ullmann's Encyclopedia of Industrial Chemistry, Wiley VCH, 2006, available on-line Dec. 15, 2006.*
Barker, et al., "Petroleum" in Kirk-Othmer Encyclopedia of Chemical Technology, 2005, John Wiley & Sons, available on-line May 13, 2005.*

(Continued)

*Primary Examiner* — In Suk Bullock
*Assistant Examiner* — Bradley Etherton
(74) *Attorney, Agent, or Firm* — Kelly L. Cummings

(57) ABSTRACT

Process for hydrogenating a carboxylic acid or derivative thereof by feeding a carboxylic acid or derivative thereof and hydrogen to a reactor, maintaining conditions therein such that hydrogen reacts with the carboxylic acid and/or derivative thereof to form a product stream including one or more hydrocarbons and one or more oxides of carbon and feeding the product stream to a flash separator. A vapor fraction including the one or more oxides of carbon is separated from a liquid fraction having the one or more hydrocarbons. The concentration of carbon oxides in the flash separator is at or below a predetermined value.

9 Claims, 1 Drawing Sheet

(56) References Cited

OTHER PUBLICATIONS

Seador, et al., Distillation in Perry's Chemical Engineer's Handbook, 7th ed., McGraw-Hill, 1997, available on-line at www.knovel.com Mar. 1, 2001.*

World Fuels Today, Jan. 4, 2006 (5 pgs).

Huber, G.W., et al; "Processing biomass in conventional oil refineries: Production of high quality diesel by hydrotreating vegetable oils in heavy vacuum oil mixtures"; Applied Catalysis A: General 329; pp. 120-129 (2007).

U.S. Department of Energy (DOE); "Opportunities for Biorenewables in Oil Refineries Final Technical Report"; STI reference DE-FG36-05G015085 (Dec. 12, 2005).

Anonymous: "Le Chatelier's principle" Wikipedia, The Free Encyclopedia, [Online], XP002423236.

International Search Report for PCT/GB2007/003757, mailed Jan. 18, 2008.

Written Opinion of the International Searching Authority for PCT/GB2007/003757, mailed Jan. 18, 2008.

\* cited by examiner

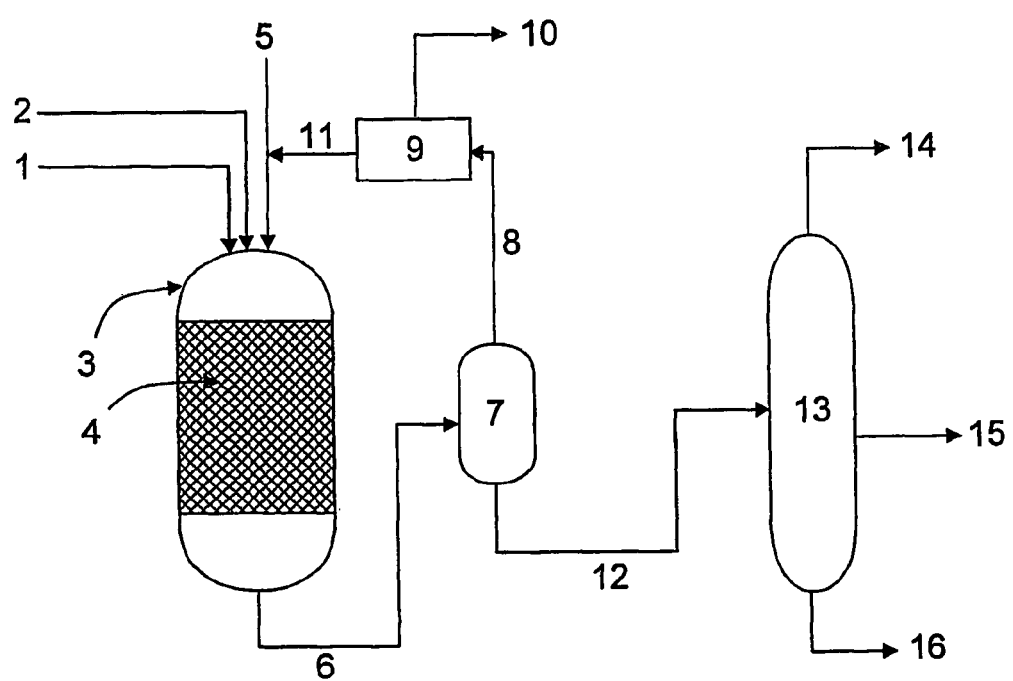

PROCESS FOR HYDROGENATION OF CARBOXYLIC ACIDS AND DERIVATIVES TO HYDROCARBONS

This application is the U.S. national phase of International Application No. PCT/GB2007/003757, filed 4 Oct. 2007, which designated the U.S. and claims priority to Europe Application No. 06255162.7, filed 6 Oct. 2006, the entire contents of each of which are hereby incorporated by reference.

This invention relates to the field of hydrogenation, more specifically to a process for the hydrogenation of a carboxylic acid and/or derivative thereof to produce one or more hydrocarbons.

BACKGROUND OF THE INVENTION

It is widely believed that increased concentrations of atmospheric carbon dioxide ($CO_2$) can lead to climate change through global warming effects. The burning of fossil fuels is thought to be chiefly responsible for such atmospheric increases, and governments are beginning to set targets for regulating or reducing anthropogenic carbon dioxide emissions in an attempt to mitigate and reduce such effects.

Liquid fuels, such as gasoline, liquefied petroleum gas (LPG), diesel and aviation fuels, are major sources of atmospheric carbon dioxide emissions. In the main, they are derived from fossil fuels such as crude oil, natural gas and coal. Natural gas and coal, for example, can be converted to syngas through processes such as steam reforming or partial oxidation in which the syngas is subsequently converted into liquid hydrocarbon products by Fischer Tropsch synthesis. Crude oil is typically distilled into various fractions based on different boiling points in a refinery, which can be used as fuels directly, or after further conversion.

One approach for reducing human-related contributions to atmospheric $CO_2$ concentrations is to use biomass as a fuel, or to prepare fuels from a biomass source. Biomass is ultimately produced from atmospheric carbon dioxide through photosynthesis and related processes, and hence any $CO_2$ released on combustion will have been originally derived from the atmosphere. The fuels can therefore be regarded as $CO_2$-neutral.

An example of biomass-derived fuel is biodiesel. One type of biodiesel comprises a blend of regular fossil fuel-derived diesel and a biological oil (bio-oil), typically a plant oil such as rapeseed, sunflower or corn oil. However, use of biological oils directly as a fuel is not always desirable as they can cause engine fouling through coking or polymerisation, and can contaminate the engine lubricant, reducing its effectiveness.

Biological oils are chiefly comprised of fatty acid triglycerides, and they can be converted into hydrocarbons corresponding to the fatty acid hydrocarbon chains by reaction with hydrogen, in a process often referred to as hydrodeoxygenation. An example of such a process is described in U.S. Pat. No. 5,705,722, which relates to the production of hydrocarbons through the hydrogenation of biological oils, and blending the hydrocarbons with diesel fuel.

Another hydrodeoxygenation process has been described by Baldauf & Balfanz in VDE Reports No 1126 (1994) pp 153-168, in which biologically-derived oils can be co-fed with a mineral oil feedstock to a refinery hydrodesulphurisation unit, wherein the mineral oil is hydrodesulphurised and the biological oil hydrodeoxygenated simultaneously to produce a diesel fuel.

However, a problem with the aforementioned hydrodeoxygenation processes is that oxides of carbon ($CO_x$) are produced. Typically, these are separated from the product hydrocarbons in the vapour fraction of a flash separator, together with unreacted hydrogen. It is desirable to recycle hydrogen to the reactor to save excessive waste. However, the presence of carbon oxides in the vapour fraction restricts the quantity that can be recycled, as carbon oxides would otherwise accumulate in the reactor at levels which would negatively affect hydrocarbon yields and contribute to catalyst deactivation.

SUMMARY OF THE INVENTION

Therefore, there remains a need for an improved process for producing hydrocarbons from biologically-derived oils which mitigates or even eliminates such problems.

According to the present invention, there is provided a process for producing hydrocarbons from a carboxylic acid and/or derivative thereof, which process comprises the steps of;
(a) feeding hydrogen and a reaction composition comprising a carboxylic acid and/or derivative thereof to a reactor;
(b) maintaining conditions within the reactor such that the hydrogen reacts with the carboxylic acid and/or derivative thereof to produce one or more oxides of carbon and one or more product hydrocarbons derived from the carboxylic acid and/or derivative thereof;
(c) removing from the reactor a product stream comprising unreacted hydrogen, the one or more product hydrocarbons, and the one or more oxides of carbon from the reactor;
(d) feeding the product stream to a flash separator;
(e) removing from the flash separator a vapour fraction and a liquid fraction, in which the vapour fraction comprises hydrogen and the one or more oxides of carbon, and the liquid fraction comprises the one or more product hydrocarbons; characterised in that the concentration of one or more oxides of carbon in the vapour fraction from the flash separator is maintained at or below a pre-determined value.

The process of the present invention can be used to produce a hydrocarbon fuel through hydrodeoxygenation of carboxylic acid and/or derivative thereof. Depending on the boiling point ranges of the one or more product hydrocarbons derived from the carboxylic acid and/or derivative thereof, they can be used directly as fuels, for example as diesel, gasoline or aviation fuel, or they can be blended with existing fuel stocks. As there is little or no difference between the hydrocarbons in the existing fuel stocks, and the product hydrocarbons derived from the carboxylic acid and/or derivative thereof, then there are no compatibility issues with existing engines, and hence no engine modifications are required.

The process comprises feeding a reaction composition comprising the carboxylic acid and/or derivative thereof to a reactor, wherein it is converted in the presence of hydrogen into one or more product hydrocarbons. Carbon monoxide and carbon dioxide (collectively referred to as $CO_x$) are also produced. A product stream comprising the product hydrocarbons, unreacted hydrogen and $CO_x$ is removed from the reactor and fed to a flash separator, in which a vapour fraction comprising volatile components such as unreacted hydrogen and $CO_x$ are separated from a liquid fraction comprising the one or more product hydrocarbons. In order to recycle unreacted hydrogen, and to improve the hydrogen efficiency of the process, the $CO_x$ needs to be separated from the hydrogen. This is typically extremely complex and difficult to achieve, and hence in conventional practice a purge stream is taken from the gaseous mixture to prevent $CO_x$ and other impurities from accumulating in the reactor. Increased concentrations of $CO_x$ in the reactor can lower hydrogen partial pressures therein, resulting in reduced product hydrocarbon yields. Additionally the presence of carbon monoxide in particular can cause loss of catalyst activity through formation of volatile metal carbonyl species, some of which can be highly toxic, for example nickel carbonyl.

It has now been found that $CO_x$ concentrations in the vapour fraction of the flash separator can be maintained at or below a pre-determined value by controlling various reaction parameters, for example one or more of the temperature, the pressure, the hydrogen partial pressure and the molar ratio of hydrogen to carboxylic acid and/or derivative thereof. By maintaining the concentration of one or more oxides of carbon at or below the pre-determined value, the percentage of the vapour fraction that needs to be removed via the purge stream can be reduced, and hence the quantity of hydrogen recycled can be increased, thus improving hydrogen utilisation and reducing waste. Controlling the composition of the vapour fraction from the flash separator, and hence the hydrogen recycle stream, is different to use of a purge stream, which only controls the quantity of the vapour fraction which is recycled to the reactor.

The $CO_x$ concentrations in the vapour fraction of the flash separator can be reduced by increasing the hydrogen partial pressure in the reactor, for example by increasing total pressure and/or by increasing flow rate of hydrogen into the reactor. The total pressure is typically maintained at or above 20 bara (2 MPa), for example at or above 50 bara (5 MPa) to ensure sufficient conversions. The pressure is typically maintained at or below 200 bara (20 MPa) to reduce the costs associated with high reactor specifications and compression equipment that would otherwise be necessary for higher pressures. Increasing total reactor pressure can also decrease vapour fraction $CO_x$ concentrations, and can be achieved for example by increasing flow rate of one or more of fresh hydrogen or the hydrogen recycle stream from the vapour fraction of the flash separator to the reactor. The $CO_x$ concentrations can also be decreased by increasing the mole ratio of hydrogen to carboxylic acid and/or derivative thereof, for example by increasing hydrogen flow rate to the reactor, by reducing the flow of process streams comprising carboxylic acid and/or derivative thereof to the reactor, or by reducing the concentration of carboxylic acid and/or derivative thereof in the reaction composition, such as by increasing its dilution with feedstock hydrocarbons as described below. The mole ratio of hydrogen ($H_2$) to the carboxylate groups present in the carboxylic acid and/or derivative thereof is preferably maintained at or above 3:1 to ensure sufficient product hydrocarbon yield. Another way to reduce the $CO_x$ concentrations is to increase the reaction temperature. To maintain sufficient reaction rates, the temperature is preferably maintained at or above 200° C., while temperatures at or below 430° C. are preferably maintained to ensure sufficient selectivity towards the desired product hydrocarbons.

In a preferred embodiment of the present invention, the pre-determined value for the concentration of total $CO_x$ in the vapour fraction of the flash separator is 1 wt % or below, such as 0.1 wt % or below. Preferably, the concentration is 500 ppm or below, such as 100 ppm or below. Preferably, at least a portion of the vapour fraction is recycled to the reactor, the proportion of the recycled vapour fraction optionally being controlled by use of a purge stream.

The concentration of one or more oxides of carbon in the vapour fraction can be determined by various means, for example chromatographic techniques such as gas chromatography, or by optical techniques such as infrared or near-infrared spectroscopy. These can optionally be used in an on-line configuration. The pre-determined value can be for one of the oxides of carbon, for example individual pre-determined values for either or both carbon monoxide and/or carbon dioxide, or alternatively can be a single value for the combined total $CO_x$ concentration. An advantage of determining the CO, $CO_2$ or total $CO_x$ concentrations in the vapour fraction of the flash separation zone is that fewer additional components are present compared to the product stream removed from the reactor, which prevents possible peak overlaps and interference, resulting in improved accuracy in the analytical measurements.

The hydrogenation reaction in the reactor may be catalysed or uncatalysed, preferably catalysed. Suitable catalysts include hydrotreating catalysts, for example those comprising one or more of Pd, Pt, Ni, Ru, Cu, Co, Cr, Mo and W, particularly preferred catalysts comprising Ni or Co in combination with Mo. The catalyst is typically supported on an inorganic oxide such as zirconia, titania or gamma-alumina, preferably gamma-alumina.

The reaction composition can comprise more than one carboxylic acid and/or derivative thereof. The one or more carboxylic acids and/or derivatives thereof are preferably chosen such that the boiling point characteristics and/or the number of carbon atoms in the product hydrocarbons produced therefrom are in the same range as those of the desired hydrocarbon fuel. For example, diesel fuels typically comprise hydrocarbons having in the range of from 10 to 22 carbon atoms, and typically have a boiling point range of or within 150 to 400° C. Thus, carboxylic acids and/or derivatives thereof which produce hydrocarbons with numbers of carbon atoms in this range and/or which boil at or within this temperature range are suitable for being used as diesel fuel, or for blending with diesel fuel.

A derivative of a carboxylic acid is a compound that can liberate the corresponding carboxylic acid when hydrolysed, for example an ester or an anhydride. Included in this definition are compounds comprising more than one carboxylate group, for example di-carboxylic acids, di-esters, or di- or tri-glycerides. Fatty acids and/or their esters are also suitable, with general formula $R^1C(O)OH$ and/or $R^1C(O)O-R^2$, where $R^1$ and $R^2$ are typically hydrocarbon chains. Examples of fatty acids and/or esters suitable for use in accordance with the present invention in the production of a diesel fuel include, for example, lauric, myristic, palmitic, stearic, linoleic, linolenic, oleic, arachidic and erucic acids and/or esters thereof, wherein $R^1$ comprises 11, 13, 15, 17, 17, 17, 17, 19 and 21 carbon atoms respectively. The esters may comprise $R^2$ groups with in the range of from 1 to 6 carbon atoms, for example methyl, ethyl, propyl or butyl, or alternatively the ester may be a mono-, di- or triglyceride, with general formula $[R^1C(O)O]_nC_3H_5(OH)_{3-n}$ where n=1, 2 or 3 for mono-, di- or tri-glycerides respectively. The fatty acids and/or esters thereof may have saturated or unsaturated hydrocarbon groups. Di- or tri-glycerides may comprise hydrocarbon chains derived from the same or different fatty acids.

In a preferred embodiment of the invention, the carboxylic acid and/or derivative thereof is derived from biomass, such that product hydrocarbons derived therefrom have a reduced or even zero contribution to atmospheric $CO_2$ concentrations. Examples of biologically-derived carboxylic acids and/or derivatives thereof include fatty acid triglycerides, which are typically the main components of plant or animal-derived oil or fats, and also the corresponding free fatty acids.

Suitable biological sources of carboxylic acids and/or derivatives thereof include plant-derived oils, such as rapeseed oil, palm oil, peanut oil, canola oil, sunflower oil, tall oil, corn oil, soybean oil and olive oil. Animal oils or fats, such as fish oil, lard, tallow, chicken fat, or milk and milk-derived products, are also suitable, as are oils derived from microorganisms, for example microalgae. Waste oils, such as used cooking oils, can also be used.

The biological oils or fats preferably comprise fatty acids whose hydrocarbon groups have numbers of carbon atoms commensurate with hydrocarbons typically found in diesel fuel. The corresponding product hydrocarbons so-obtained can be used directly as a diesel fuel, or alternatively blended or otherwise incorporated into diesel fuel from other sources, such as mineral-derived sources. Preferably, hydrodeoxygenation of the carboxylic acid and/or derivative thereof produces product hydrocarbons having in the range of from 15 to 18 carbon atoms.

Optionally, if the product hydrocarbons are linear, they can undergo subsequent isomerisation to produce fuels with improved properties, such as higher combustion performance and/or improved cold flow characteristics.

In the hydrodeoxygenation of carboxylic acids and/or derivatives thereof, the product hydrocarbons are believed to be produced via at least two different reaction pathways. One pathway is hydrogenation of the carboxyl group, which produces water and results in the carboxyl carbon being part of the product hydrocarbon. Another pathway is $CO_2$ elimination, which results in the formation of $CO_2$ and a product hydrocarbon lacking the carboxyl carbon.

One reaction pathway is illustrated in equation I, relating to the hydrodeoxygenation of a fatty acid triglyceride, wherein the carboxyl group is removed from the fatty acid component as $CO_2$, referred to as decarboxylation, leaving a product hydrocarbon (RH) lacking the carboxylate carbon.

$$(R-C(O)-O)_3-C_3H_5 + 3H_2 \rightarrow 3RH + 3CO_2 + C_3H_8 \qquad I$$

An alternative pathway involves hydrogenation of the carboxyl group, in which oxygen is removed from the molecule as water, according to equation II, and results in a product hydrocarbon comprising the carboxylate carbon ($RCH_3$).

$$(R-C(O)-O)_3-C_3H_5 + 12H_2 \rightarrow 3RCH_3 + C_3H_8 + 6H_2O \qquad II$$

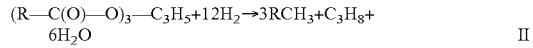

Other reactions that are thought to occur are the reduction of $CO_2$ to carbon monoxide and methane, according to reactions III and IV.

$$CO_2 + H_2 \rightarrow CO + H_2O \qquad III$$

$$CO + 3H_2 \rightarrow CH_4 + H_2O \qquad IV$$

The carboxylic acid and/or derivative thereof may not be the sole constituent of the reaction composition. In one embodiment, the reaction composition also comprises hydrocarbons, henceforth referred to as feedstock hydrocarbons to distinguish them from the product hydrocarbons produced from hydrodeoxygenation of the carboxylic acid and/or derivative thereof. Suitable feedstock hydrocarbons include those derived from refinery process streams, or those derived from Fischer-Tropsch synthesis. In one embodiment, the feedstock hydrocarbons are themselves suitable for use as a fuel, such as gasoline, diesel or aviation fuel. Feedstock hydrocarbons resulting from the refining of crude oil and suitable for use as a diesel fuel can be derived, for example, from one or more refinery process streams such as straight-run middle distillate or heavy gas oil fraction, or catalytically cracked vacuum gas oil. In an alternative embodiment, they may be a relatively crude mixture of hydrocarbons, resulting from a combination of several hydrocarbon process streams. The product stream, comprising the product hydrocarbons, can then be distilled or fractionated to produce one or more hydrocarbon fuels, for example one or more of gasoline, diesel or aviation fuel.

Optionally, where the feedstock hydrocarbons comprise heteroatom-containing compounds, for example sulphur-containing components such as mercaptans or thiophenic compounds which are often present in refinery streams, they can be subjected to a prior hydrotreatment, such as hydrodesulphurisation, before being fed to the reactor with the carboxylic acid and/or derivative thereof. Alternatively, such hydrotreating reactions can be carried out simultaneously with and in the same reactor as the hydrodeoxygenation reaction that produces product hydrocarbons from the carboxylic acid and/or derivative thereof. Thus, the process of the present invention can be used simultaneously to deoxygenate the carboxylic acid and/or derivative thereof and to desulphurise feedstock hydrocarbons within the same reactor. Such a process is advantageous as it can be retrofitted to existing refinery processes, which reduces the quantity of equipment required, and hence minimises capital and operational expenditure.

In processes where the reaction comprises feedstock hydrocarbons in the diesel fuel boiling range, the concentration of carboxylic acid and/or derivative thereof is preferably at least 1 wt % and preferably at least 2 wt %, as the product hydrocarbons derived from carboxylic acids and/or derivatives thereof, particularly biological oils, improve the ignition properties and cetane rating of the resulting diesel fuel. Additionally, the concentration of carboxylic acid and/or derivative is preferably 50 wt % or less, such as 40 wt % or less, and is more preferably 20 wt % or less, in order to minimise the extent of modification required in hydrogen recycle apparatus between the flash separation zone and the reactor when retrofitting the process to existing refinery hydrotreating or hydrodesulphurisation units.

Hydrotreating processes, for example as used for desulphurising diesel fuel and/or hydrodeoxygenation of the carboxylic acid and/or derivative thereof, are typically carried out at temperatures in the range of from 200 to 430° C. and pressures in the range of from 20 to 200 bara (2 to 20 MPa), for example in the range of from 50 to 200 bara (5 to 20. MPa). The severity of the conditions depends on the nature of the feedstock hydrocarbons and carboxylic acid and/or derivative thereof being fed to the reactor, and on the nature of the desired fuel. In a preferred embodiment, in which the feedstock hydrocarbons are suitable for use as diesel fuel and the source of carboxylic acid and/or derivative thereof is a biological oil, reaction temperatures in the range of from 200 to 410° C. are maintained, preferably in the range of from 320° C. to 410° C., and typical reaction pressures in the range of from 20 to 200 bara (2 to 20 MPa) preferably from 50 to 200 bara (5 to 20 MPa) are maintained. Under these conditions, conversions of greater than 90% of the co-fed carboxylic acid and/or derivative thereof are typical, and usually greater than 95% conversion is achieved. The hydrogenation reactions are suitably catalysed by hydrotreating catalysts, as described above.

Where the reaction composition comprises sulphur compounds, typically as a constituent of feedstock hydrocarbons, hydrogen sulphide ($H_2S$) is produced, which is separated from the product hydrocarbons and feedstock hydrocarbons in the vapour fraction of the flash separator. The liquid fraction comprises both product and feedstock hydrocarbons. In order to prevent $H_2S$ from being returned to the reactor, it can be stripped from the vapour fraction, typically using a liquid amine, before unreacted hydrogen is recycled back to the reactor. The presence of $CO_x$ is undesirable in such a process, as carbon dioxide in particular will also dissolve in the amine together with the $H_2S$. This reduces the concentration of $H_2S$ that can be absorbed by the amine, which increases the quantity of amine required, and hence increases the energy and materials required for regeneration and recycling of the amine.

The liquid fraction from the flash separator is typically fed to a further separation unit, for example a fractionation or distillation unit, to separate the hydrocarbon mixture into various fuel fractions, for example a diesel fraction, a kerosene fraction and a light fraction comprising LPG and gasoline hydrocarbons.

In the production of a diesel fuel through co-hydrogenation, crude oil refinery-derived hydrocarbons are typically used as feedstock hydrocarbons, which predominantly comprise alkanes together with lesser amounts of olefins and/or one or more heteroatom-containing compounds. Typically, the heteroatom-containing compounds are sulphur-containing compounds such as sulphides, thiophenes, benzothiophenes and mercaptans. The composition of the feedstock hydrocarbons can vary, depending on the nature of the refinery streams used and the source of crude oil from which they are derived. Typically, the sulphur content is 200 ppm or more, such as 0.1% by weight or more, for example in the range of from 0.2 to 2% by weight, expressed as elemental sulphur. Olefins may be present at concentrations typically above 0.01 wt %, and may be present at concentrations up to 20% by weight, for example up to 10% by weight or up to 5% by weight. Other possible constituents of the first hydrogen-containing product stream include aromatic compounds, or cyclic alkanes such as naphthenes.

Sulphur concentrations remaining in the product hydrocarbon and feedstock hydrocarbon-containing liquid fraction of the flash separator are typically less than 200 ppm expressed as elemental sulphur. Furthermore, olefins concentrations are typically lower than 1 wt %, for example 0.1 wt % or less. The liquid fraction comprises hydrocarbons resulting from the hydrotreated fuel hydrocarbon precursor stream, and also one or more hydrocarbons resulting from the carboxylic acid and/or derivative thereof. Typically, the liquid fraction is subsequently fractionated to separate components into various fuel fractions.

BRIEF DESCRIPTION OF THE DRAWING

The process will now be illustrated by the following example, and with reference to FIG. 1 which is a schematical illustration of a process in accordance with the present invention.

DETAILED DESCRIPTION OF PREFERRED EMBODIMENTS

A biological oil or fat 1 and a mineral oil 2 derived from a mixture of refinery process streams comprising feedstock hydrocarbons in the diesel fuel boiling range and one or more sulphur compounds are fed to reactor 3 containing a fixed bed of a hydrotreating catalyst 4, typically NiMo on alumina or CoMo on alumina. Hydrogen is fed to the reactor through line 5. A product stream is removed from the reactor through line 6 and fed to a flash separator 7, in which a vapour fraction 8 comprising unreacted hydrogen, light hydrocarbons such as methane and propane, water, hydrogen sulphide and $CO_x$, is separated from a liquid fraction 12 comprising desulphurised mineral oil hydrocarbons and product hydrocarbons derived from the biological oil or fat.

The vapour fraction 8 is optionally fed to a hydrogen sulphide separator 9 comprising an amine which absorbs $H_2S$ and also some carbon dioxide and water. Amine is removed for regeneration 10 and separation of hydrogen sulphide. The remainder of the vapour fraction, comprising predominantly hydrogen is recycled back to the reactor via lines 11 and 5. The liquid fraction 12 of the flash separator is fed to a fractionation column 13, wherein a fraction 14 comprising gasoline components, light hydrocarbons, and gases is removed from the top, a heavy fraction 16 comprising diesel components is removed from the base, and optionally, a kerosene fraction 15 typically suitable for use as aviation fuel is removed from an intermediate region of the column.

The invention claimed is:

1. A process for producing hydrocarbons from a carboxylic acid and/or derivative thereof, which process comprises the steps of:
    (a) feeding hydrogen and a reaction composition comprising a carboxylic acid and/or derivative thereof and feedstock hydrocarbons to a reactor, wherein the source of the carboxylic acid and/or derivative thereof is biological fat and wherein the feedstock hydrocarbons are derived from the refining of crude oil and comprise sulphur compounds in an amount of from 0.2 to 2% by weight expressed as elemental sulphur;
    (b) maintaining conditions within the reactor such that the hydrogen reacts with the carboxylic acid and/or derivative thereof to produce one or more oxides of carbon and one or more product hydrocarbons derived from the carboxylic acid and/or derivative thereof, and the sulphur compounds react in the reactor to form hydrogen sulphide, wherein the reaction is catalysed and is performed at a temperature in the range of from 200 to 430° C. and a pressure in the range of from 20 to 200 bara (2 to 20 MPa);
    (c) removing from the reactor a product stream comprising unreacted hydrogen, the one or more product hydrocarbons, the hydrogen sulphide and the one or more oxides of carbon from the reactor;
    (d) feeding the product stream to a flash separator;
    (e) removing from the flash separator a vapour fraction and a liquid fraction, in which the vapour fraction comprises hydrogen, the hydrogen sulphide and the one or more oxides of carbon, and the liquid fraction comprises the one or more product hydrocarbons;
    (f) stripping the hydrogen sulphide from the vapour fraction using a liquid amine; and
    (g) recycling at least a portion of the vapour fraction to the reactor;
    wherein the process comprises controlling one or more of the reaction temperature, the partial pressure of hydrogen in the reactor, the total pressure in the reactor, and the mole ratio of hydrogen to carboxylic acid and/or derivative thereof in the reactor such that the total concentration of the one or more oxides of carbon in the vapour fraction from the flash separator is maintained at or below a value of 500 ppm by weight.

2. A process as claimed in claim 1, in which the source of carboxylic acid and/or derivative thereof is a biological oil or fat.

3. A process as claimed in claim 1, in which the one or more product hydrocarbons are used as or are blended with diesel, gasoline or aviation fuel.

4. A process as claimed in claim 1, in which the number of carbon atoms in the one or more product hydrocarbons is in the range of from 10 to 22.

5. A process as claimed in claim 1, in which the reaction composition additionally comprises feedstock hydrocarbons derived from the refining of crude oil.

6. A process as claimed in claim 5, in which the feedstock hydrocarbons are desulphurised or non-desulphurised diesel fuel.

7. A process as claimed in claim 1, in which the liquid fraction from the flash separator is separated into two or more fractions.

8. A process as claimed in claim 1, in which the sulphur compounds are a constituent of feedstock hydrocarbons that are also present in the reaction composition.

9. A process as claimed in claim 1, in which the catalysed reaction is carried out in the presence of a catalyst comprising one or more of Pd, Pt, Ni, Ru, Cu, Co, Cr, Mo and W.

* * * * *